United States Patent
Caruana

(10) Patent No.: US 8,571,596 B2
(45) Date of Patent: Oct. 29, 2013

(54) METHOD OF POWER NEGOTIATION BETWEEN TWO CONTACTLESS DEVICES

(75) Inventor: Jean-Paul Caruana, La Seyne sur Mer (FR)

(73) Assignee: Gemalto SA, Meudon (FR)

( * ) Notice: Subject to any disclaimer, the term of this patent is extended or adjusted under 35 U.S.C. 154(b) by 0 days.

(21) Appl. No.: 13/509,750

(22) PCT Filed: Nov. 16, 2010

(86) PCT No.: PCT/EP2010/067525
§ 371 (c)(1),
(2), (4) Date: May 14, 2012

(87) PCT Pub. No.: WO2011/067102
PCT Pub. Date: Jun. 9, 2011

(65) Prior Publication Data
US 2012/0289161 A1 Nov. 15, 2012

(30) Foreign Application Priority Data
Dec. 4, 2009 (EP) .................................. 09306180

(51) Int. Cl.
*H04B 7/00* (2006.01)
*H04B 5/00* (2006.01)
*H04B 7/185* (2006.01)

(52) U.S. Cl.
USPC ......................... 455/522; 455/41.1; 370/318

(58) Field of Classification Search
USPC ............. 455/41.1, 41.2, 41.3, 522, 67.11, 69; 370/318
See application file for complete search history.

(56) References Cited

U.S. PATENT DOCUMENTS

| 5,905,372 | A * | 5/1999 | Kuffner et al. ................ 323/356 |
| 7,274,911 | B2 * | 9/2007 | Li ................................ 455/41.2 |
| 7,760,574 | B2 * | 7/2010 | Chen et al. .................... 365/226 |
| 8,135,384 | B2 * | 3/2012 | Hassan et al. ................. 455/410 |
| 2004/0242258 | A1 | 12/2004 | Kim |
| 2008/0176581 | A1 * | 7/2008 | Abdel-Kader ............. 455/456.2 |
| 2009/0280819 | A1 * | 11/2009 | Brisebois et al. ............. 455/446 |
| 2010/0214958 | A1 * | 8/2010 | Wijayanathan et al. ...... 370/255 |
| 2011/0090887 | A1 * | 4/2011 | Kim et al. ..................... 370/338 |
| 2012/0052876 | A1 * | 3/2012 | Anderson et al. .......... 455/456.1 |
| 2012/0166671 | A1 * | 6/2012 | Qi et al. ........................ 709/236 |
| 2012/0184318 | A1 * | 7/2012 | Lee et al. ...................... 455/515 |
| 2012/0289253 | A1 * | 11/2012 | Haag et al. ................. 455/456.2 |

FOREIGN PATENT DOCUMENTS

| DE | 36 10 112 A1 | 10/1987 |
| DE | 10 2007 060 571 A1 | 6/2009 |

OTHER PUBLICATIONS

International Search Report (PCT/ISA/210) issued on Feb. 23, 2011, by the European Patent Office as the International Searching Authority for International Application No. PCT/EP2010/067525.
Written Opinion (PCT/ISA/237) issued on Feb. 23, 2011, by the European Patent Office as the International Searching Authority for International Application No. PCT/EP2010/067525.

* cited by examiner

*Primary Examiner* — Andrew Wendell
(74) *Attorney, Agent, or Firm* — Buchanan Ingersoll & Rooney PC

(57) ABSTRACT

The invention is a method of power negotiation between a first contactless device and a second contactless device which provides an electromagnetic field set to a first power level. The method comprises the steps of: a) sending a request from the first device to the second device. The request targets a second power level and an associated duration. The next step is: b) sending a response to the first device. The response reflects a decision of the second device corresponding to the request. The final step is: c) switching the electromagnetic field to the second power level if the decision is positive.

16 Claims, 3 Drawing Sheets

| B7 | B6 | POWER CHANGE REQUEST |
|---|---|---|
| 0 | 0 | MINIMUM POWER LEVEL |
| 0 | 1 | LOWER LEVEL |
| 1 | 0 | HIGHER LEVEL |
| 1 | 1 | MAXIMUM LEVEL |

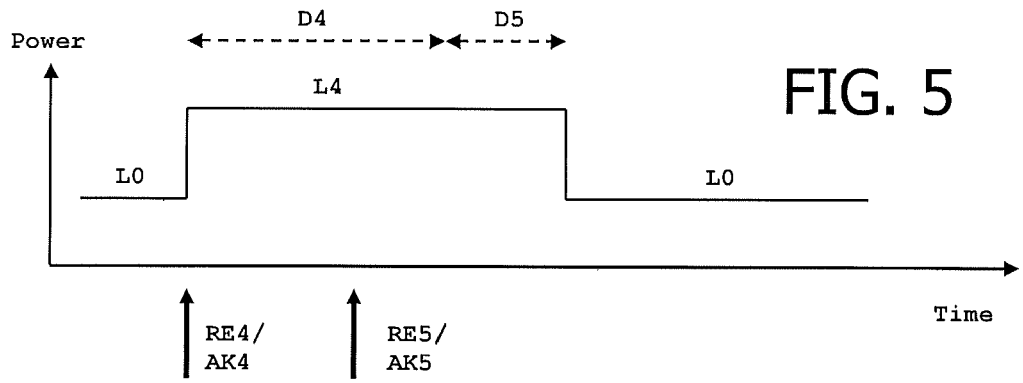
FIG. 5
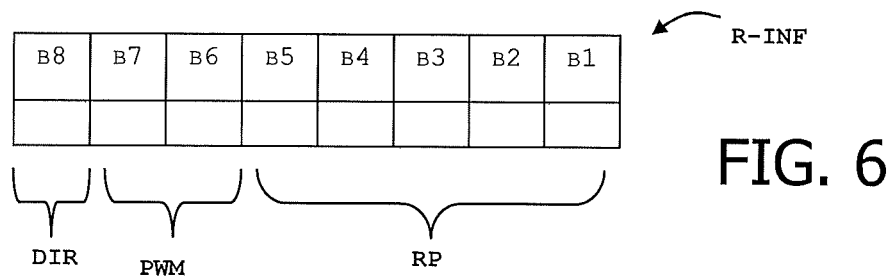
FIG. 6
| B7 | B6 | POWER CHANGE REQUEST |
|----|----|----------------------|
| 0  | 0  | MINIMUM POWER LEVEL  |
| 0  | 1  | LOWER LEVEL          |
| 1  | 0  | HIGHER LEVEL         |
| 1  | 1  | MAXIMUM LEVEL        |
FIG. 7

METHOD OF POWER NEGOTIATION BETWEEN TWO CONTACTLESS DEVICES

FIELD OF THE INVENTION

The present invention relates to methods of power negotiation between two contactless devices. It relates particularly to methods for selecting a power level at the reader device side according to requirements of a contactless device which uses an electromagnetic field as energy source.

PRIOR ART

The NFC (Near Field Communication) technology is based on the exchanging of data via a magnetic field. A NFC reader has an antenna which is able to modulate the electromagnetic field and to provide energy to NFC devices. The NFC reader is usually named a PCD (Proximity Coupling Device). The NFC device may be a PICC (Proximity Integrated Circuit Card or Proximity Card) or may embed components which act as logical PICC. The PICC and the PCD communicate thanks to an inductive coupling in a field frequency equal to 13.56 MHz. In particular, the ISO14443 and ISP18092 standards provide modulation technologies and communication protocols which may be used in NFC domain.

The reader may set the electromagnetic field to a plurality of power level. According to the standards of the contactless technology, contactless cards shall be able work in an electromagnetic field having a power level equal to 1.5 Ampere/meter.

Flash memories allow storing very large amounts of data. Unfortunately, the "power-on" phase of flash memory requires at least a power level of 2.5 Ampere/meter in an ID1 card. Thus a contactless card may not have enough energy to start a flash memory. In a passive mode, the contactless card cannot manage a flash memory because the card must be compliant with contactless readers which are limited to 1.5 A/m.

There is a need for allowing a contactless card to manage a flash memory.

SUMMARY OF THE INVENTION

An object of the invention is to solve the above mentioned technical problem.

The object of the present invention is a method of power negotiation between a first contactless device and a second contactless device. The second contactless device provides an electromagnetic field which is set to a first power level. The method comprises the steps of:

a) sending a request from the first device to the second device, said request targeting a second power level and a duration, b) sending a response to the first device, said response reflecting a decision of the second device corresponding to the request, c) switching the electromagnetic field to said second power level if the decision is positive.

Advantageously, the method may comprise the step of switching the electromagnetic field to said first power level at the end of the duration.

The second power level may be higher than the first power level.

The second power level may be lower than the first power level.

In a preferred embodiment, the first device is contactless card and the second device is a contactless reader.

Advantageously, the first device may comprise a flash memory.

In another embodiment, the second device may have power capabilities and the response may comprise data related to the power capabilities.

Advantageously, the response may comprise data related to the first power level.

The request may comprise data corresponding to the difference between first and second power levels.

In one embodiment, the step of switching to the second power level may be carried out when a further command is exchanged between said first and second devices.

Another object of the invention is a contactless device which is intended to be in an electromagnetic field set to a first power level. The device comprises a first means a second means and a third means. The first means is capable of identifying the first power level. The second means is capable of identifying a second power level and an associated duration. The third means is capable of building a request that targets the second power level and the duration.

Advantageously, the contactless device may be a contactless card comprising a flash memory.

Another object of the invention is a contactless device comprising a communication means capable of providing an electromagnetic field which can be set to first and second power levels. The contactless device comprises a negotiation means capable of analyzing a request coming from a second contactless device of the type of the first object of the invention. The request asks for a switching to a second power level for a specific duration. The negotiation means is capable of making a decision corresponding to the request and to switch the electromagnetic field to the second power level if the decision is positive.

Advantageously, the negotiation means may be able to automatically switch the electromagnetic field to the first power level at the end of the specific duration.

In one embodiment, the negotiation means may be able to send a response which reflects the decision to the second contactless device.

In another embodiment, the contactless device has power capabilities and the response may comprise data related to the power capabilities.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which:

FIG. 5 is a diagram showing a second example of several modifications of the power level of the electromagnetic field generated by a reader device according to the invention;

FIG. 6 is another example of INF field of a request according to the invention; and FIG. 7 is an example of power change request coding according to the invention.

DETAILED DESCRIPTION OF THE PREFERRED EMBODIMENTS

The invention may apply to any types of contactless device. In particular, the invention may apply to devices complying with the Very High Data Rate (VHDR) protocol as defined by the WG8N865 document or the TF2 N461 proposal. The invention may apply to contactless devices complying with the ISO/IEC14443, ISO/IEC21481 or ISO/IEC 18092 or ISO/IEC 15693 standards. The invention may apply to contactless devices in many domains, like e-Passport, e-Health, e-Access, e-payment and so on.

The contactless device that provides an electromagnetic field may be a contactless reader or any device able to act as a contactless reader. For example this contactless device may be a portable device like a mobile phone or an Electronic Funds Transfer Terminal for payment. The reader may also be a fixed device like an access reader or a border Control for e-passport.

The invention relies on the fact that a first contactless device may dynamically ask another contactless device to temporary modify its electromagnetic field power level. Thus a contactless card may get more energy when required for specific internal treatments.

An advantage of the invention is to allow a contactless device to ask a reader to decrease the electromagnetic field power level. Thus power consumption of the contactless reader may be saved, especially when low energy level is required by the contactless device that uses the electromagnetic field as energy source. This power saving is particularly useful for NFC devices.

Moreover the reader may accept or reject the request of power level change. Thus the reader remains master. In addition, the reader device may manage power change requests coming from a plurality of contactless cards, by keeping the highest requested value.

Another advantage of the invention is to inform a contactless device that uses an electromagnetic field as energy source of the power capabilities of the device that generates the electromagnetic field. Thus the contactless card may adapt its further power change requests and the sequence of its internal treatments according to the reader capabilities.

The invention may apply to any types of contactless devices intended to use an electromagnetic field provided by another device. In particular, such contactless devices may be cards or passport booklet. For example the invention may apply to ID1 and ID3 cards, as defined by ICAO 9303 standard.

Figure 1:
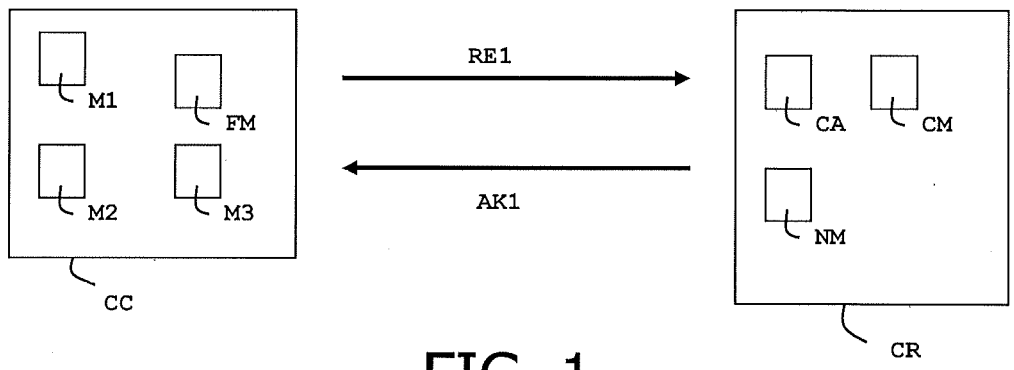
FIG. 1 depicts schematically an example of communication exchanges between a contactless card and a contactless reader according to the invention.

FIG. 1 shows an example of communication exchanges between a contactless card CC and a contactless reader CR. According to one embodiment of the invention, the reader device CR is a mobile phone.

The device CR has contactless reader features and comprises an antenna (not drawn) and a contactless controller (not drawn). The device CR comprises a communication means CM which is capable of generating an electromagnetic field. The electromagnetic field may be set to at least first and second power levels. By default the device CR generates an electromagnetic field at the first power level L0. The power level L0 is equal to 1.5 A/m. The device CR comprises a negotiation means NM able to analyze a request RE1 which asks for a switching to another power level L1 for duration D1. The negotiation means NM is also able to accept or reject the power change request and to switch the electromagnetic field to the power level L1 if the power change request is accepted.

The negotiation means NM is able to automatically switch the electromagnetic field to the default power level L0 after the power level L1 has been provided during the period D1. Alternatively, another means may trigger the switching step to power level L0.

The negotiation means NM may also be able to send a response AK1 corresponding to the request RE1. The response AK1 comprises data which reflects the decision related to the power change request (i.e. acceptance or rejection).

In a preferred embodiment, the device CR has its own power capabilities CA. For example, the power capabilities may be defined by the minimum and maximum power values of the electromagnetic field generated by the device CR. The response AK1 may comprise data related to the power capabilities CA.

The contactless card CC comprises a means M1 able to measure the current power level L0 of the electromagnetic field. The contactless card CC comprises a means M2 able to identify a power level L1 and a duration D1 associated to the power level L1. The identification of the power level L1 and duration D1 is made by taking into account the future power requirements of the contactless card CC. In particular, these future power requirements may depend on planned treatments which must be performed into the card CC.

The contactless card CC comprises a means M3 able to build a request RE1 which requests a power change to the power level L1 during the period D1. The request RE1 is intended to be sent to the contactless device that produces the electromagnetic field.

In a preferred embodiment, the contactless device CC comprises a flash memory FM.

Thus the couple request RE1/response AK1 allows the contactless card CC and the device CR to negotiate the power level that will be applied.

Figure 2:
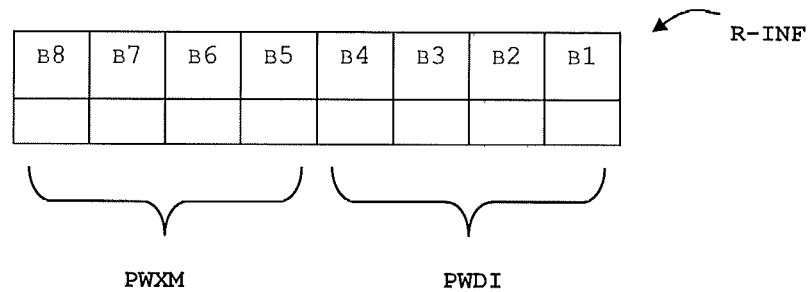
FIG. 2 is an example of INF field of a request according to the invention.

FIG. 2 shows an example of a field contained in the request RE1 according to the invention.

The ISO/IEC 14443-4 standard defines S( ) block request and S( ) block response. In a preferred embodiment, the request RE1 is a S( ) block request that contains a one byte-long INF field. In particular, the request RE1 may be done thanks to a S(PWX) request, where PWX stands for "Polder eXtension".

FIG. 2 shows an example of INF field of the request RE1: R-INF.

The field R-INF comprises two parts: PWXM and PWDI. The part PWXM contains the value of the requested power extension. In the example of FIG. 2, the PWXM value is coded on the four most significant bits (i.e. B8 to B5) in the range from 0 up to 15. Assuming that RE1 aims at setting the electromagnetic field to the level L1, the requested power extension is equal to the difference between levels L0 and L1. In other words, PWXM is equal to L1−L0.

The part PWDI contains a value related to the targeted duration D1 associated to the power level L1. In the example of FIG. 2, the PWDI value is coded on the four least significant bits (i.e. B4 to B1) in the range from 0 up to 14. The value 15 is not used. The duration D1 may be computed according to the formula:

$$D1 = (256 \times (16/fc)) \times 2^{PWDI}$$

where fc is the carrier frequency expressed in MHz.

In this case, the computed duration D1 is expressed in microseconds.

In particular, the carrier frequency fc may be equal to 13.56 MHz.

For example, if PWDI is equal to 7, the duration D1 is equal to around 38.6 milliseconds.

The default value of PWDI may be 4. This value corresponds to a duration D1 equal to around 4.8 milliseconds.

Figure 3:
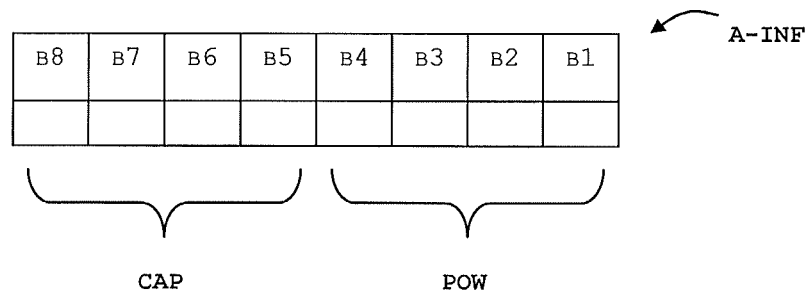
FIG. 3 is an example of INF field of a response according to the invention.

FIG. 3 shows an example of a field contained in the response AK1 according to the invention.

In a preferred embodiment, the response AK1 is a S( ) block response that contains a one byte-long INF field. In particular, the response AK1 may be done thanks to a S(PWX) response.

FIG. 3 shows an example of INF field of the request RE1: A-INF.

The field A-INF comprises two parts: CAP and POW.

The part CAP contains a value related to the power capabilities CA of the device CR. In the example of FIG. 3, the CAP value is coded on the four most significant bits (i.e. B8 to B5) in the range from 0 up to 15. For example, when CAP is equal to 11, the reader device CR has a minimum power level equal to 1.5 A/m maximum power level equal to 3 A/m. In another example, when CAP is equal to 15, the reader device CR has a minimum power level equal to 1.5 A/m maximum power level equal to 7.5 A/m.

The part POW contains a value related to the current power level which is used by the device CR. This data allows the device CC to get the power level L0 currently used. Thus knowing the current level L0 and the requested extension, the device CC is able to compute the next power level L1. In the example of FIG. 3, the POW value is coded on the four least significant bits (i.e. B4 to B1) in the range from 0 up to 15.

Advantageously, the field A-INF may be set to zero (i.e. CAP=0 and POW=0) when the device CR rejects the power extension request.

In the above-described examples, the duration D1 is expressed as a time duration. Alternatively, the duration D1 may be expressed as a number preset events. For example, the duration D1 may be defined by a threshold of executed commands or exchanged requests.

Advantageously, the device CC may request several successive power extensions. In particular, an additional power change request may be sent when the previous power change is still active.

In a preferred embodiment, the later power extension is computed from the previous power level.

Alternatively, the later power extension is computed from the default power level.

Figure 4:
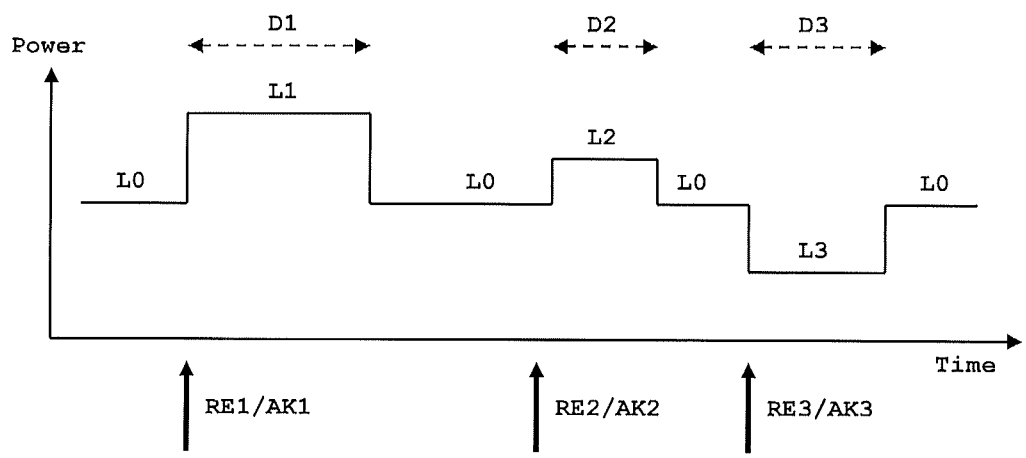
FIG. 4 is a diagram showing a first example of several modifications of the power level of the electromagnetic field generated by a reader device according to the invention.

FIG. 4 shows a first diagram where the power level of the electromagnetic field is modified according to the invention.

The electromagnetic field is generated by the device CR with a default value equal to L0.

When the device CC needs additional energy, the device CC sends the request RE1 in order to reach the power level L1 during a period D1. The device CR accepts the power change request and sends the response AK1. Although the couple RE1/AK1 is drawn as a unique arrow, the building and sending of these two messages require a short time duration. In other words the sending of RE1/AK1 is not instantaneous.

Then the power level of the electromagnetic field is set to L1. This level is kept during a period equal to D1. Then the device CR set the power level of the electromagnetic field to L0. When the power level is set to L1, the device CC may perform internal treatments which need a high level of energy. For example, a contactless card may start its flash memory during the duration D1.

Then the device CC may need another additional energy during a limited period. The device CC sends a request RE2 in order to reach the power level L2 during a period D2. The device CR accepts the power change request and sends a corresponding response AK2. Then the power level of the electromagnetic field is set to L2. This level is kept during a period equal to D2. At the end of the duration D2, the device CR set the power level of the electromagnetic field to L0.

Then the device CC may have no energy need for a duration D3. Thus the device CC may send a request RE3 in order to reach the power level L3 during a period D3. The device CR accepts the power change request and sends a corresponding response AK3. Thus the power level of the electromagnetic field is set to L3. This level is kept during a period equal to D3. When the end of the duration D3 is reached, the device CR set the power level of the electromagnetic field to L0. In the example of FIG. 4, L0 may be equal to 1.5 Ampere/meter, L1 may be equal to 2.5 Ampere/meter and L3 may be equal to 1.0 Ampere/meter.

Each time, the new power level is activated just after the sending of the Sblock response.

Advantageously, the device CC may manage a timer allowing to check if a response has been received in a preset period. Such a case may happen when the device which generates the electromagnetic field is not able to treat a change power request. For example, the preset period may be set to one or five milliseconds.

FIG. 5 shows a second diagram where the power level of the electromagnetic field is modified according to the invention.

The electromagnetic field is generated by the device CR with a default value equal to L0.

When the device CC needs additional energy, the device CC sends the request RE4 in order to reach the power level L4 during a period D4. The device CR accepts the power change request and sends the corresponding response AK4. Then the power level of the electromagnetic field is set to L4 by the device CR. If the internal treatments of the device CC require an additional time for the level L4, the device CC may send another request RE5 before the end of the duration D4. The additional request RE5 will aim at keeping the current power level L4 during an additional period D5. The device CR accepts the power change request and sends a corresponding response AK5. Then the power level of the electromagnetic field is kept to L4 during a period equal to D4+D5.

For example L0 may be equal to 1.5 Ampere/meter, L4 may be equal to 4.5 Ampere/meter, D4 may be equal to 12 milliseconds and D5 may be equal to 8 milliseconds.

In one embodiment, the PWXM value as shown at FIG. 2 may be coded with the four most significant bits (i.e. B8 to B5) set to zero. Thus the value 0 for PWXM means a time extension is requested for the current power level.

An advantage of the invention is to allow storing a large volume of data thanks to the use of flash memory in contactless devices which get its energy source from an electromagnetic field.

In another embodiment, the device CR which generates the electromagnetic field may send a specific message in response to a power change request. The specific message may contain a request asking the user of the device CC to approach the device CR.

FIG. 6 shows a second example of a field R-INF contained in the request RE1 according to the invention.

The field R-INF comprises three parts: DIP, PWM and RP. The part DIR is coded on a single bit (b8) and corresponds to the type of power change: either increase or decrease. For example, b8=0 may mean that a power decrease is requested and b8=1 may mean that a power increase is requested.

The part RP is made by the last five bits (b5 to b1) and remains reserved for a future use. In other words, the value of the part RP is not used for the power change request. Preferably RP may be set to zero.

The part PWM is coded on two bits (b7b6) and corresponds to the targeted power level. The targeted power level may be the highest or the lowest power level which may be generated by the device CR. The targeted power level may also be the level just below/above the current power level.

FIG. 7 shows an example of power change request coding. In particular, FIG. 7 provides an example of coding for the part PWM.

For example, the combination b7=0 and b6=0 may mean that the targeted power level is the lowest power level supported by the device CR. The combination b7=1 and b6=1 may mean that the targeted power level is the highest power level supported by the device CR. The combination b7=1 and b6=0 may mean that the targeted power level is one step higher than the power level currently provided by the device CR. The combination b7=0 and b6=1 may mean that the targeted power level is one step lower than the current power level generated by the device CR. In other words, this last combination requests an increment in the level just below the current power level.

In the example of FIG. 6, the field R-INF does not comprise an explicit value related to the duration associated to the targeted power level. In this case, the duration is implicitly defined by the command currently in progress. For instance, the sequence may be as follow. First, the reader CR sends a first I_block as defined in the ISO 14443 standard. Then the device CC sends a S(PWX) request comprising an INF field according to the FIG. 6. Then the reader CR accepts the power change request and sends a S(PWX) response to the device CC. The reader CR switches the electromagnetic field to the power level targeted by the S(PWX) request. Then the device CC sends an I_block response. On receipt of the I_block response, the reader CR switches the electromagnetic field to the default power level.

In other words, the duration may start with the sending of the S(PWX) response and may end with the end of the command currently treated by the device CC.

The precise value of the duration may be unknown at the time of the S(PWX) request sending. The duration may be implicitly linked to an event related to the end of a treatment in the requesting device CC.

The invention claimed is:

1. A method of power negotiation between a first contactless device and a second contactless device, said second contactless device providing an electromagnetic field which is set to a first power level, said first contactless device using the electromagnetic field as an energy source, wherein said method comprises the steps of:
   a) sending a request from the first device to the second device, said request targeting a second power level and a duration;
   b) sending, to the first device, a response, corresponding to the request, said response (i) reflecting a decision of the second device by indicating acceptance or rejection of said request, and (ii) including, at least when indicating acceptance of said request, power capabilities of the second device that define the minimum and maximum power levels which may be provided by the second device; and
   c) if the decision indicates acceptance of said request, and subsequent to sending the response to the second device, switching the electromagnetic field to said second power level.

2. A method according to claim 1, wherein said method comprises the step of:
   switching the electromagnetic field to said first power level at the end of the duration.

3. A method according to claim 1, wherein said second power level is higher or lower than said first power level.

4. A method according to claim 1, wherein said first device is contactless card and said second device is a contactless reader.

5. A method according to claim 1, wherein said first device comprises a flash memory.

6. A method according to claim 1, wherein said response comprises data related to the first power level.

7. A method according to claim 1, wherein said request comprises data corresponding to the difference between first and second power levels.

8. A method according to claim 1, wherein said step of switching to the second power level is carried out when a further command is exchanged between said first and second devices.

9. A method according to claim 1, wherein said first device sends a second request to said second device while said second power level is active, said second request requesting to maintain said second power level during an additional duration.

10. A method according to claim 1, wherein said first device is used by a user and wherein said response comprises a request asking the user to approach said second device.

11. A first contactless device configured to be used in an electromagnetic field which is set to a first power level, said first contactless device using the electromagnetic field as an energy source, said first contactless device comprising:
   a first means able to identify said first power level,
   a second means able to identify a second power level and an associated duration,
   a third means configured to build a request targeting said second power level and duration; and
   a fourth means configured to receive a response from a second device (i) indicating acceptance or rejection of said request and (ii) including, at least when indicating acceptance of said request, power capabilities of the second device that define the minimum and maximum power levels which may be provided by the second device.

12. A contactless device according to claim 11, wherein said device is a contactless card comprising a flash memory.

13. A contactless device according to claim 11, wherein the electromagnetic field is generated by the other contactless device and wherein said contactless device is configured to send a second request to said other contactless device, said second request requesting to maintain said second power level during an additional duration.

14. A second contactless device, comprising a communication means configured to provide an electromagnetic field which can be set to first and second power levels, and wherein said second device comprises a negotiation means configured to:
   analyze a request coming from a first contactless device requesting a switching to a second power level for a duration,
   make a decision with respect to acceptance or rejection of the request;

send a response to the first contactless device, the response (i) reflecting said decision by indicating acceptance or rejection of said request and (ii) including, at least when indicating acceptance of said request, power capabilities of the second contactless device that define the minimum and maximum power levels which may be provided by the contactless device; and if the decision indicates acceptance of said request, and subsequent to sending the response to the second contactless device, switch the electromagnetic field to said second power level.

15. A contactless device according to claim 14, wherein said negotiation means is configured to automatically switch the electromagnetic field to said first power level at the end of the duration.

16. A contactless device according to claim 14, wherein said response comprises a request asking a user of said second contactless device to approach said contactless device.

\* \* \* \* \*